INVENTOR
Robert A. Hill
BY
ATTORNEY

April 18, 1961 R. A. HILL 2,980,391
SOLENOID OPERATED PRIMING VALVE
Filed April 19, 1956 3 Sheets-Sheet 3

INVENTOR
Robert A. Hill
BY
ATTORNEY

United States Patent Office 2,980,391
Patented Apr. 18, 1961

2,980,391

SOLENOID OPERATED PRIMING VALVE

Robert A. Hill, Minneapolis, Minn., assignor to Waterous Company, St. Paul, Minn., a corporation of Minnesota Filed Apr. 19, 1956, Ser. No. 579,312

5 Claims. (Cl. 251—210)

This invention relates to an improvement in solenoid operated priming valves and deals particularly with a type of valve useful in the priming of centrifugal pumps and the like.

Centrifugal pumps of the type used on fire fighting equipment and the like are normally primed by priming pumps which are connected to suitable places on the centrifugal pump to evacuate the air therefrom. These pumps are usually controlled manually and are often gear connected to the fire truck through a suitable clutch, although electric motors have also been used for this purpose. In order to make the operation more automatic, it is now desired to provide electric means for operating the valve so that it can be operated by remote control more effectively than would otherwise be possible.

The present invention relates to a priming valve capable of accomplishing this result.

In view of the fact that fire fighting equipment must be ready for operation under almost any type of emergency, it is desirable that the valve be capable of operation manually as well as electrically. As a result, in the event the electrical operating system does not function properly, the valve must be operable manually so that the apparatus can function. Accordingly, it is another object of the present invention to provide an electrically operable priming valve which may also be operated manually if desired.

A further feature of the present invention resides in the fact that the priming valve is constructed so that leakage past the valve will not take place under ordinary circumstances. The priming valves are usually connected by suitable conduits to the suction eyes of the various stages of the centrifugal pump. In some instances the priming valve is also connected to the discharge of the pump to evacuate air therefrom. When the pump is operating in series the suction eye of the second impeller or second stage is subject to water pressure from the discharge of the first stage. In such a case, as well as in cases where the priming valve is connected to the pump discharge, the valve is subject to considerable fluid pressure. In order to prevent leakage of the valve, this fluid pressure is utilized to supplement the spring pressure normally used to close the valve and to hold it in closed position so that the valve is positively held in closed position during the operation of the pump.

A further feature of the present invention resides in the provision of a priming valve which is connected to a part of a centrifugal pump which may be subjected to elevated pressures and in providing a groove in the wall of the cylinder containing the valve piston which may transmit the fluid pressure on opposite ends of the valve piston in such a way as to exert more pressure against the side of the valve opposite the valve seat than against the end of the valve which is adjacent to the valve seat. As a result, an unbalanced pressure is provided which tends to hold the valve closed thereby insuring the effective closing of the valve when the pump is in operation.

These and other objects and novel features of the present invention will be more clearly and fully set forth in the following specification and claims.

In the drawings forming a part of the specification:

Figure 1:
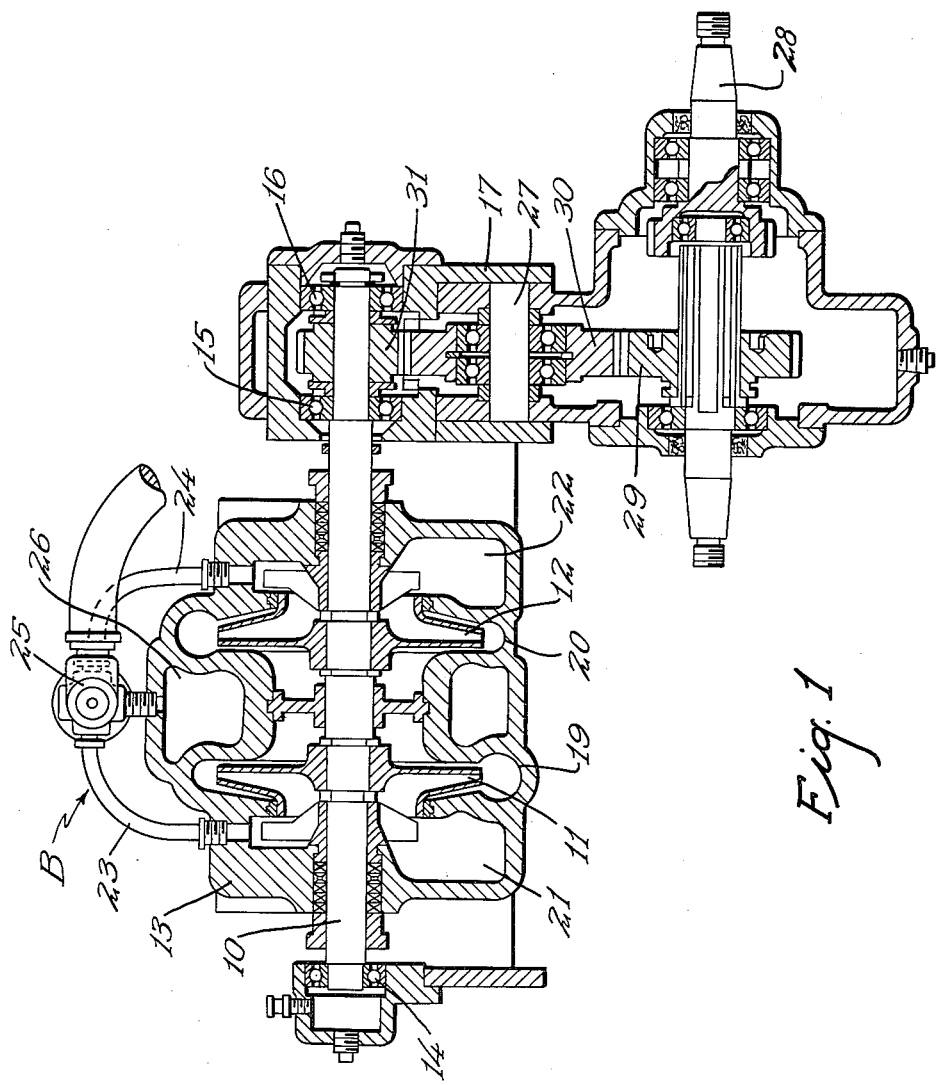
Figure 1 is a cross sectional view of a typical centrifugal pump showing the air evacuation lines connected thereto.
Figure 2:
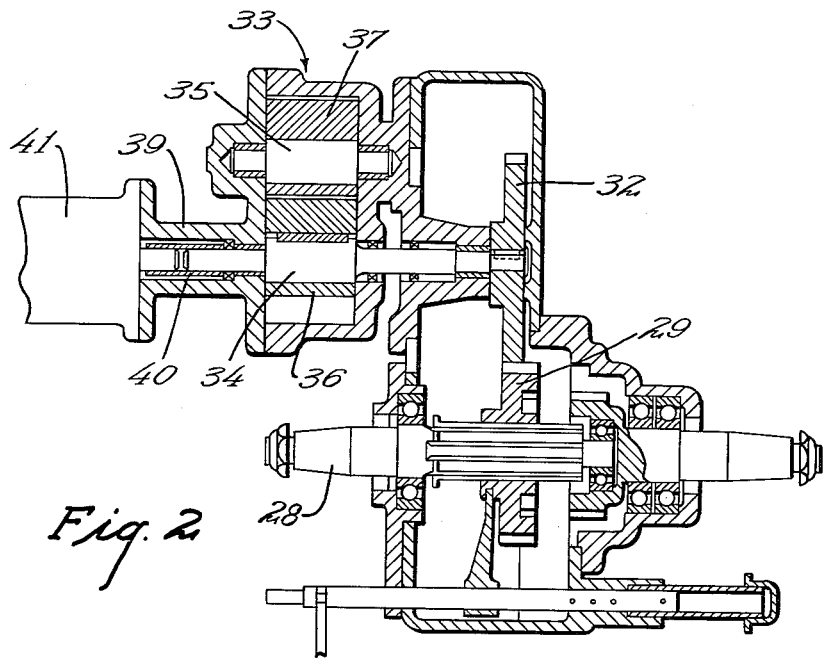
Figure 2 is a horizontal sectional view through the same pump showing the manner in which the priming pump may be connected to the centrifugal pump.

The priming valve, which is indicated in general by the letter A, is designed for use upon a multi-stage centrifugal pump, which is indicated in general by the letter B. The pump B which is illustrated in Figures 1 and 2 of the drawings is only illustrative of a type of pump for which the valve is designed, and, accordingly, the details of the pump will only be described in general.

The centrifugal pump B includes an impeller shaft 10 on which are mounted a pair of impellers 11 and 12 which are arranged in spaced relationship. The shaft 10 is supported to extend through the pump housing 13 and is supported by suitable bearings, one such bearing being illustrated at 14 and other bearings being indicated at 15 and 16 within a gear case 17 which is attached to the housing 13.

The impellers 11 and 12 are mounted in volutes 19 and 20, respectively, which are suitably connected to the pump discharge manifold 26. It should be noted that the discharge from one of the impellers such as impeller 11 may be connected either to the discharge manifold or to the intake of the impeller 12. In other words, the pump is of the series, parallel type so that the operator may either provide more volume of fluid or more pressure as is required to fit the circumstances.

Fluid to the impellers 11 and 12 is supplied through suction eyes 21 and 22, at least one of which is connected to a suitable water supply. In the event the pump is operated with the impellers in series, the suction eye 22 is subject to the fluid pressure of the discharge of the first impeller 11.

A tubular connection 23 is illustrated connected to the suction eye 21 of the impeller 11. A similar tubular connection 24 is shown connected to the suction eye 22 of the second impeller 12. A third connection 25 may, if desired, be connected to the discharge manifold 26, this arrangement being somewhat of a matter of choice. In other words, the connection 25 to the manifold 26 may be entirely eliminated if desired.

The gear case 17 is shown as including a drive shaft 28, an idler shaft 27 and an end of the impeller shaft 10. A gear 29 on the drive shaft 28 is connected to an idler gear 30 on the idler shaft 27 which in turn engages a cooperable gear 31 on the impeller shaft 10. Thus, rotation of the drive shaft 28 acts to rotate the impeller shaft.

With reference now to Figure 2 of the drawings, it will be seen that the drive shaft 28 and the gear 29 also is in mesh with a priming pump gear 32 when the pump is to be primed. In other words, the gear 29 is movable longitudinally of the drive shaft 28 and may be engaged therewith when desired to operate the priming pump. The priming pump itself is indicated in general by the numeral 33 and includes a priming pump shaft 34 on which the gear 32 is mounted as well as a parallel shaft 35. Pump rotors 36 and 37 are mounted on these shafts and are in mesh so as to provide a positive displacement pump of the type normally used for priming a centrifugal pump.

If desired, the priming pump 33 may be provided with an extension 39 accommodating an end of the shaft 34 and this shaft may be connected by a suitable coupling 40 to an electric motor 41 so that the pump may be electrically operated if desired. In other words, if preferred, the priming pump may be connected either to the truck engine or to the motor 41 for its priming operation.

The priming valve is best illustrated in Figures 3 through 7 of the drawings and is designed for connection to various parts of the pump. For example, in the particular arrangement illustrated in Figure 6 of the drawings, the valve body 42 is provided with a pair of opposed inlets 43 and 44 and a third inlet 45. This third inlet 45 is connected to a point of higher pressure in the pump than the inlets 43 and 44. In the event the inlets 43 and 44 are connected to the suction eyes, the port 45 may be connected to the discharge. In the event only two connections are used, the port 45 is connected to the suction eye of the second stage.

In the particular arrangement illustrated, the connections 23 and 24 would normally be connected to the inlets 43 and 44 of the valve housing. The discharge connection 25 would be connected to the valve intake port 45. However, in the event the connection 25 were eliminated, the port 45 would be connected to the connection with the second stage suction eye.

Figure 3:
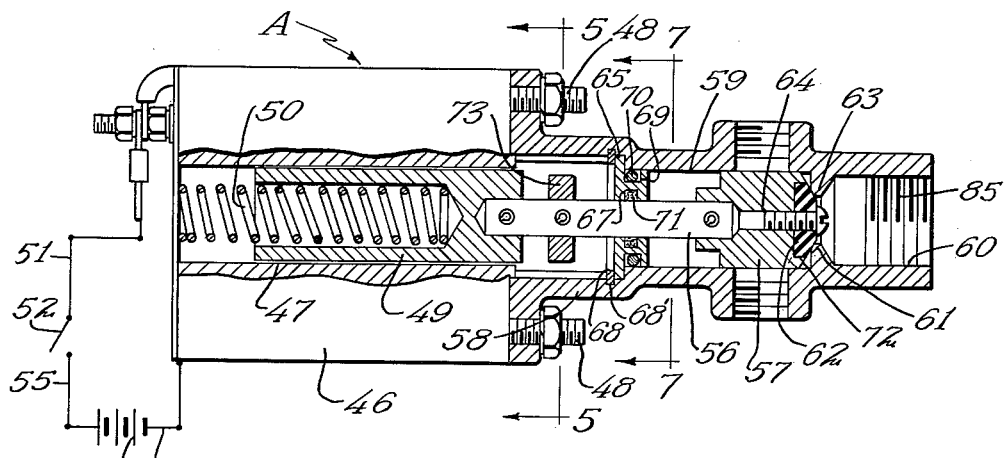
Figure 3 is a sectional view through the priming valve showing in general the arrangement of parts therein.

The valve A includes a solenoid 46 having a central aperture 47 extending therethrough. A core 49 made of iron or other material attractive to magnetism is slidably supported in the central aperture 47. A spring 50 normally biases the core 49 in one direction. Upon energization of the solenoid 46 the core 49 is moved to the left as illustrated in Figure 3 of the drawings, thus opening the valve. When the magnetic force is released, the spring 50 again moves the valve to the right thus acting to close the valve.

The solenoid 46 is shown as having two terminals, one of which is connected by the conductor 51 to the operating switch 52 and the other conductor of the two being connected to the battery 54. The other terminal of the battery 54 is connected by a conductor 55 to the switch 52. Accordingly, upon closing of the switch 52, the solenoid 46 is energized to move the core 49 to the left as viewed in Figure 3.

The core 49 is connected by a connecting rod 56 to a valve element 57. The valve element 57 is slidable within valve cylinder 59 and actually comprises a piston slidably supported in the valve cylinder 59. When in the position illustrated in full lines in Figure 3 of the drawings, the valve element 57 closes the connection between the various ports, 43, 44 and 45. However, when the core 49 is moved to the left, these three ports are connected to the valve discharge 60 through a discharge aperture 61 against which the valve element 57 seats. The valve element 57 is provided with a resilient valve seat 62 or compressive element which engages against the partition wall 63 through which the aperture 61 extends. The resilient element 62 is replaceable and is held in position by means of a cap screw 64 or other similar means.

A partition 65 is provided encircling the valve operating rod 56 so as to prevent the leakage of fluid into the solenoid. This partition 65 is provided with an exterior groove 69 and an interior groove 67. Sealing rings 70 and 71 are provided in the grooves 67 and 69 for preventing the leakage of fluid either between the partition wall and the remainder of the housing or between this partition wall and the valve operating rod 56.

The partition 65 is held in place against the end of the valve cylinder 59 by means of a snap ring 68 which fits into a cooperable groove 68' in the adjoining portion 58 of the cylinder casting which is of slightly greater internal diameter. By removal of the snap ring 68, the partition can be removed, permitting removal of the piston 57 when the cylinder casting is detached from the solenoid 46 by removal of the bolts 48.

The extremity of the valve element 57 is beveled or tapered as is indicated at 72 so that fluid may flow between the outer end of the valve element 57 and the valve housing. A collar 73 is mounted upon the valve shaft 56 for movement in conjunction therewith. The purpose of this collar 73 will be later described in detail.

Figure 4:
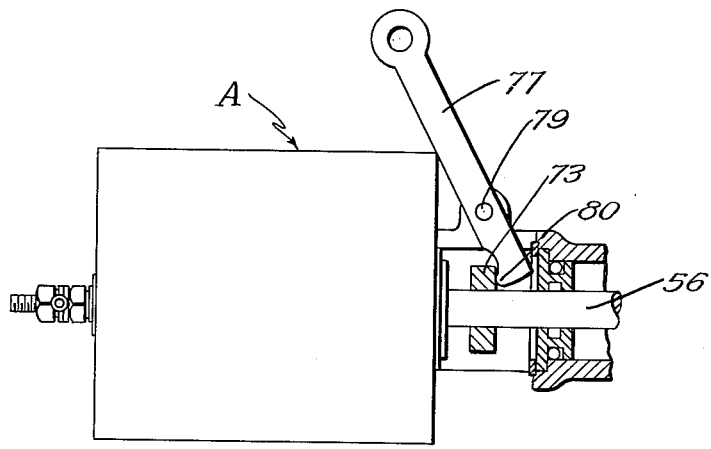
Figure 4 is a sectional view through a portion of the valve illustrated in Figure 3, the solenoid portion of the valve being shown in full lines.
Figure 5:
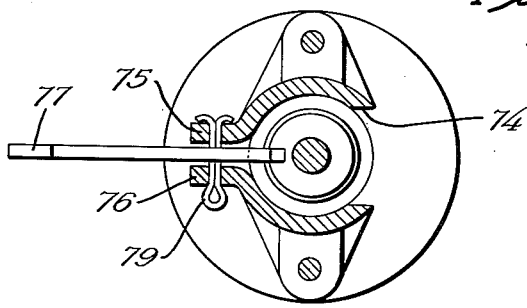
Figure 5 is a sectional view through the valve shown in Figures 3 and 4, the position of the section being indicated by the line 5—5 of Figure 3 of the drawings.

As is indicated in Figure 5 of the drawing, the portion of the valve housing between the solenoid and the discharge end of the housing is cut away as indicated at 74 so that any fluid under pressure may escape from the housing in the event such fluid should pass the partition wall 70. This portion of the housing is provided with a pair of spaced ears 75 and 76 extending outwardly in parallel relation from the housing. A manual control arm 77 is pivotally supported at 79 to the ears 75 and 76 as best illustrated in Figures 4 and 5 of the drawings. This manual control arm 77 has its lower end 80 engageable with the collar 73 on the shaft 56. Accordingly, by rotating the manual control arm 77 in a clockwise direction as viewed in Figure 4 of the drawings, the collar 73 and the shaft 56 to which it is secured may be moved to the left as viewed in these figures so as to open the valve manually when and if such manual operation is necessary.

Figure 7:
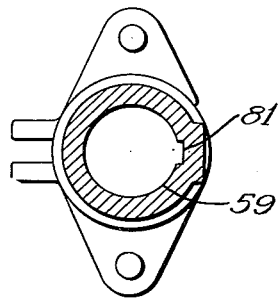
Figure 7 is a cross sectional view through the valve housing, the position of the section being indicated by the line 7—7 of Figure 3 of the drawings.
Figure 6:
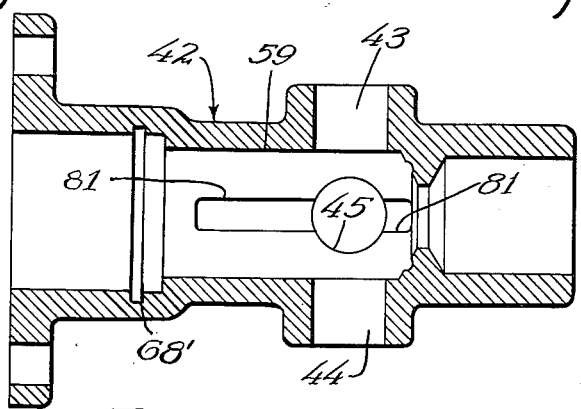
Figure 6 is a cross sectional view through the valve housing with the interior portions of the valve removed.

As is indicated in Figures 6 and 7 of the drawings, a slot 81 is provided in the valve cylinder 59, the slot extending longitudinally of the cylinder. The slot 81 is of sufficient length to bridge the valve element 57 and acts to provide a by-pass to permit fluid under pressure to extend on opposite sides of the valve element 57. The beveled end 72 of the valve element permits a partial equalization of pressure on opposite sides of the valve piston, the area provided being less than sufficient to provide a balance of pressure on opposite ends of the valve element. In other words, the end of the valve element 57 which is to the left of the valve piston as viewed in Figure 3 of the drawings is of greater area than the area which is subject to pressure on the opposite end of this element. As a result, there is an unbalanced pressure on opposite sides of the valve piston when the pump is in operation, this unbalanced pressure being of sufficient amplitude to aid the spring 50 in holding the valve in closed position.

Thus it will be seen that I provided a priming valve which may be operated very easily when the pump is not in operation to permit air to be evacuated from the suction eyes of the pump and/or the discharge manifold thereof. By merely closing the switch 52, the valve element 57 may be moved to the left, opening the connection from the centrifugal pump to the priming pump 33. When the centrifugal pump is in operation, the switch 52 may be opened and the spring 50 will urge the valve element 57 into closed position. This action will be assisted by discharge pressure or by pressure in the suction eye of the second stage of the pump which is transmitted through the port 45 and the by-pass slot 81 to the left end of the valve element. When the valve element 57 is in its closed position, the connection between the centrifugal pump and the priming pump is closed. As is obvious, the valve outlet 60 is connected by a suitable conduit 85 to the inlet of the priming pump.

In accordance with the patent statutes, I have described the principles of construction and operation of my solenoid operated priming valve, and while I have endeavored to set forth the best embodiment thereof, I desire to have it understood that obvious changes may be made within the scope of the following claims without departing from the spirit of my invention.

I claim:

1. A valve including a valve cylinder, a valve piston slideable within said cylinder, end walls on said cylinder, one end wall on said cylinder having an outlet opening therethrough, a valve element supported on one end of said piston and seating against said one end wall about said opening, a portion of said one piston end being spaced from said one end wall when said valve element is seated, a valve port extending through the side wall of said cylinder into communication with the interior surface of said cylinder and closed by said piston in seated position of said valve element thereon, a valve rod secured to said piston and passing through the opposite end wall of said cylinder, means associated with said valve rod to move the same into position to uncover said port, a by-pass of relatively small area relative to said port extending from said port to opposite sides of said piston in said cylinder when said valve element on said valve piston is seated, the area subject to by-passed pressure acting against the end of said piston adjoining but spaced from said one end wall being smaller than the area subject to by-passed pressure acting upon the opposite end thereof.

2. The structure of claim 1 and including a partition wall forming a cylinder end closure encircling said valve rod.

3. A priming valve including a valve body having a cylindrical bore therein, an elongated valve piston reciprocally disposed within said bore, said body having an outlet at one end the edge of which is engageable by one end of said piston and an inlet intermediate the ends of said bore engageable by a side portion of said piston, whereby when said piston is moved to said one end said outlet and said inlet will both be closed and when said piston is moved toward the other end of said bore said inlet is in communication with said outlet via said bore, and fixedly located means for applying fluid pressure from said inlet to portions of both ends of said piston when said piston is closing said outlet, the portion of the piston end adjacent said outlet having a smaller area available for contact by said fluid than the other end of said piston.

4. A priming valve including a valve body having an outlet at one end and an inlet intermediate its ends, a reciprocal piston engageable with said outlet to close same, one end of said piston having a larger cross section than said outlet so as to extend beyond the edges thereof when closing said outlet to thereby provide a piston area surrounding and overhanging the area thereof actually closing said outlet, said piston also being of a length to close simultaneously said inlet when closing said outlet, and said valve body having a groove therein communicating between a locus near said outlet to a locus beyond the other end of said piston when said piston is closing said outlet, whereby fluid entering said inlet under pressure will contact the surrounding area of the piston at its said one end and the area thereof at its said other end, when the piston is closing said outlet.

5. The structure described in claim 4 including a piston rod attached to said piston, said piston projecting from the end of said valve body opposite said outlet, a closure partition at said opposite end having an aperture through which said piston rod extends, and a snap ring engaging the valve body at its said opposite end to retain said partition in place.

References Cited in the file of this patent

UNITED STATES PATENTS

| | | |
|---|---|---|
| 1,782,345 | Haentjens | Nov. 18, 1930 |
| 2,051,938 | Carlson | Aug. 25, 1936 |
| 2,071,703 | Nelson et al. | Feb. 23, 1937 |
| 2,144,613 | Broadhurst | Jan. 24, 1939 |
| 2,239,774 | Blanchard | Apr. 29, 1941 |
| 2,302,158 | Van Vulpen | Nov. 17, 1942 |
| 2,310,745 | Parks et al. | Feb. 9, 1943 |
| 2,366,006 | Culver | Dec. 26, 1944 |
| 2,578,544 | Harr | Dec. 11, 1951 |
| 2,609,206 | Moen | Sept. 2, 1952 |
| 2,623,545 | Traynor | Dec. 30, 1952 |
| 2,683,420 | Hill et al. | July 13, 1954 |
| 2,712,429 | Ray | July 5, 1955 |
| 2,758,547 | Wendell et al. | Aug. 14, 1956 |
| 2,790,393 | Thomas et al. | Apr. 30, 1957 |
| 2,797,061 | Buchanan | June 25, 1957 |

FOREIGN PATENTS

| | | |
|---|---|---|
| 82,668 | Switzerland | of 1919 |